(12) United States Patent
Pas (10) Patent No.: US 12,446,721 B2
(45) Date of Patent: Oct. 21, 2025

(54) SYSTEMS AND METHODS FOR TRANSLUCENT ARTIFICIAL FOLIAGE

(71) Applicant: BELGRAVIA WOOD LIMITED, Hong Kong (CN)

(72) Inventor: Hylke Pas, Halle (NL)

(73) Assignee: Belgravia Wood Limited, Hong Kong (CN)

( * ) Notice: Subject to any disclaimer, the term of this patent is extended or adjusted under 35 U.S.C. 154(b) by 0 days.

(21) Appl. No.: 18/263,276

(22) PCT Filed: Jan. 27, 2022

(86) PCT No.: PCT/IB2022/050734
§ 371 (c)(1),
(2) Date: Jul. 27, 2023

(87) PCT Pub. No.: WO2022/162590
PCT Pub. Date: Aug. 4, 2022

(65) Prior Publication Data
US 2024/0188744 A1    Jun. 13, 2024

Related U.S. Application Data

(60) Provisional application No. 63/142,692, filed on Jan. 28, 2021.

(51) Int. Cl.
*A47G 33/06* (2006.01)
*A41G 1/02* (2006.01)
(Continued)

(52) U.S. Cl.
CPC ............... *A47G 33/06* (2013.01); *A41G 1/02* (2013.01); *A41G 1/04* (2013.01); *A47G 33/0845* (2013.01);
(Continued)

(58) Field of Classification Search
CPC ............ A47G 2033/0827; A47G 33/06; A47G 33/0845; A47G 33/0872
(Continued)

(56) References Cited

U.S. PATENT DOCUMENTS 2,683,210 A    7/1954    Baenziger
10,288,236 B1    5/2019    Chen
(Continued)

FOREIGN PATENT DOCUMENTS

KR    102162734 B1 *    10/2020

OTHER PUBLICATIONS

Choi, KR102162734B1 Google Patents Machine Translation of Jan. 29, 2025, Oct. 7, 2020, entire trnaslation (Year: 2020).*
(Continued)

*Primary Examiner* — Katherine A Christy
(74) *Attorney, Agent, or Firm* — Greenberg Traurig LLP (57) ABSTRACT

Translucent artificial foliage and methods of manufacturing the same. Exemplary translucent artificial foliage includes an artificial foliage material. An exemplary translucent artificial foliage material includes a polymer, an anti-UV additive component, and a phosphorus fire-retardant additive component. Exemplary translucent artificial foliage includes lighting elements internal to the artificial foliage material. An exemplary method of manufacturing the artificial foliage material includes mixing a translucent artificial foliage material by combining a polymer with an anti-UV additive component and a phosphorus fire-retardant additive. The exemplary method includes inserting a wire into a mold, heating the translucent artificial foliage material, adding the translucent artificial foliage material to the mold, and cooling the mold.

9 Claims, 5 Drawing Sheets

(51) Int. Cl.
  *A41G 1/04* (2006.01)
  *A47G 33/08* (2006.01)
  *F21S 4/10* (2016.01)
  *F21V 23/00* (2015.01)

(52) U.S. Cl.
  CPC ..... *A47G 33/0863* (2013.01); *A47G 33/0872* (2013.01); *F21S 4/10* (2016.01); *F21V 23/002* (2013.01); *A47G 2033/0827* (2013.01)

(58) Field of Classification Search
  USPC .......................................................... 428/7
  See application file for complete search history.

(56) References Cited

U.S. PATENT DOCUMENTS

2001/0051279 A1    12/2001  Docherty
2005/0168973 A1     8/2005  Chuang
2019/0184625 A1*    6/2019  Katsuno ................ B32B 27/302

OTHER PUBLICATIONS

International Search Report for PCT/IB2022/050734 dated Apr. 22, 2022.

* cited by examiner

SYSTEMS AND METHODS FOR TRANSLUCENT ARTIFICIAL FOLIAGE

PRIORITY

This application claims priority to and the benefit of U.S. Provisional App. No. 63/142,692, filed Jan. 28, 2021.

FIELD

The present disclosure generally relates to festive goods and decorations and, more particularly, artificial trees, garland, wreaths, flowers, decorative products, and decorative lighting, used to decorate or otherwise to create ambiance.

BACKGROUND

Artificial trees, displayed to celebrate holidays and occasions or otherwise used to decorate and create ambiance, are growing in popularity. Presently, the foliage of decorative trees and other decorative accessories is typically opaque or tinsel, or incorporates fiber optics in the needles. A variety of styles can be created with opaque, tinsel, or fiber-optic needles. However, a need exists for novel looks and styles of artificial decorative trees and accessories.

SUMMARY

The present invention provides novel and appealing designs and styles for artificial foliage by providing translucent artificial foliage.

In an exemplary embodiment, the present invention provides artificial foliage material comprising a polymer, an anti-UV additive component in the range of about 0.1% to 0.9% of the total artificial foliage material, a phosphorus fire-retardant additive component in the range of 0.5% to 3% of the total artificial foliage material, and wherein the artificial foliage material is translucent.

In another embodiment, the present invention provides artificial foliage material comprising a polymer, wherein the artificial foliage material is translucent, and wherein the artificial foliage material includes a plurality of lighting elements internal to the artificial foliage material.

The translucent artificial foliage provided by the present invention enables the creation of foliage that resembles translucent materials in nature or otherwise in the world, such as ice, coral, or sea glass, and that resembles non-natural objects.

DETAILED DESCRIPTION

Reference will now be made in detail to exemplary embodiments, some examples of which are shown in the accompanying drawings.

Exemplary disclosed embodiments include an apparatuses, systems, and methods for providing translucent or transparent artificial foliage. The term "translucent" is used herein to refer to materials that allow light to pass through the material, including materials ranging in translucency from transparent materials that allow all light to pass through the material to near-opaque materials that allow a small amount of light to pass through the material. An ordinary artisan would understand that these materials can be translucent, transparent, iridescent, and/or clear.

Figure 1:
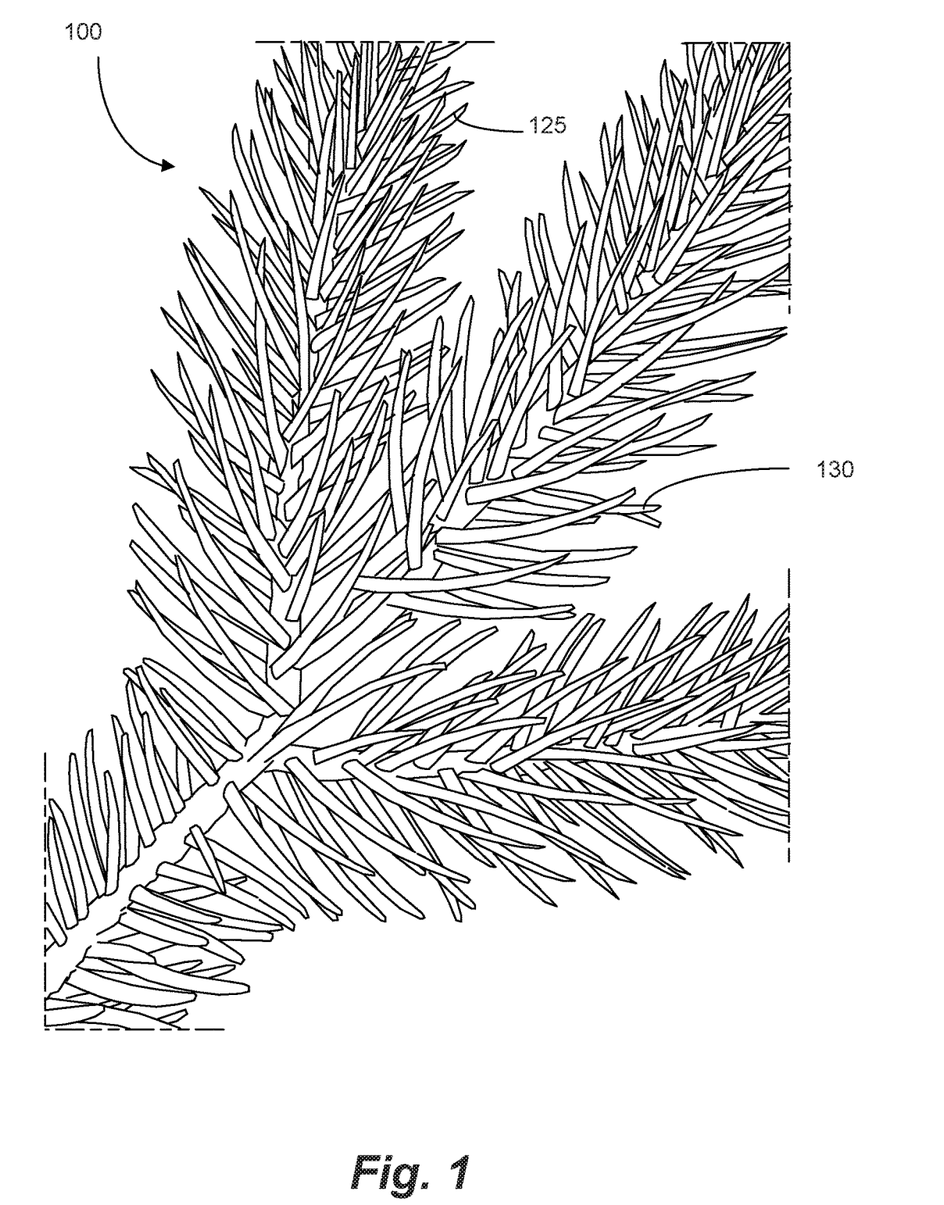
FIG. 1 is a schematic diagram of translucent artificial foliage according to an exemplary embodiment of the present invention.

Referring to FIG. 1, an exemplary embodiment of translucent artificial foliage 100 is depicted. The translucent artificial foliage 100 shown in FIG. 1 provides a branch, including needles and a stem. In one embodiment, this translucent artificial foliage 100 is just a single branch with three twigs, as depicted in FIG. 1. In another embodiment, translucent artificial foliage 100 is a portion of a translucent artificial wreath in which all of the foliage of the wreath is translucent. In another embodiment, translucent artificial foliage 100 is a portion of a translucent artificial garland in which all of the foliage of the garland is translucent. In yet another embodiment, translucent artificial foliage 100 is a portion of a translucent artificial tree, such as an artificial Christmas tree, in which all of the foliage of the tree is translucent. "Tree," as used in this disclosure, should be read to include trees that grow on land, as well as coral, such as coral that grows in the ocean. Similarly, "foliage" should not be read to be limited to the needles or leaves of branches on trees or plants on the ground, but should also include other forms in nature, such as shapes and designs made to resemble forms of coral. Therefore, the artificial foliage 100 may, in some embodiments, be shaped as one or more forms of coral, or a portion of coral or other like forms found in nature.

As shown in FIG. 1, the translucent artificial foliage 100 can have many needles, such as needle 125 and needle 130. In some embodiments, the translucent artificial foliage 100 may emulate the look of natural foliage, such as a branch as depicted in the exemplary embodiment shown in FIG. 1. However, translucent artificial foliage 100 is different from nature in that the foliage is translucent, thereby providing a different aesthetic from natural foliage. Accordingly, an exemplary embodiment of the translucent artificial foliage 100 allows at least some light to pass through the foliage. A person of skill in the art will appreciate that the various embodiments of the translucent artificial foliage 100 can allow more or less light to pass through the foliage. For example, in one embodiment, the translucent artificial foliage 100 can be semitransparent such that light is diffused by the foliage, and objects cannot be seen clearly through the foliage. In another embodiment, the translucent artificial foliage 100 can be near-transparent, such that almost all light passes through the foliage. In yet another embodiment, the translucent artificial foliage 100 can be slightly less than opaque, so that only a small amount of light is diffused by the foliage.

Embodiments of the translucent artificial foliage 100 can provide decorative products that are shaped as and resemble translucent materials in nature or otherwise in the world, such as ice, coral, or sea glass, as opposed to translucent decorations or adornments added to otherwise opaque trees. Furthermore, embodiments of the translucent artificial foliage 100 can be used in artificial Christmas trees or artificial coral that can facilitate, or make more dramatic, the effect of other materials or additives, such as inks that vary with the presence or absence of heat or light, various pigments, fluorescence, glitter, ice crystals, beads and berries, that can greatly vary the look of the trees.

The materials used for embodiments of translucent artificial foliage 100 can utilize a mixture of various materials. In an exemplary embodiment, the materials of the translucent artificial foliage 100 are substantially based on polymers, and these polymers can be polyvinyl chloride ("PVC"), polyethylene ("PE"), polypropylene, or other suitable synthetic polymers. Alternative embodiments of the translucent artificial foliage 100 can be created by other suitable organic or synthetic non-polymer materials.

In some embodiments, the translucent artificial foliage 100 can be linear low-density polyethylene ("LLDPE") or low-density polyethylene ("LDPE"). In other embodiments of the translucent artificial foliage 100, the materials are substantially based on copolymers, also in the polyolefin family, such as ethylene-vinyl acetate (commonly abbreviated "EVA"). Those of skill in the art will appreciate that different polymers or copolymers exhibit different characteristics and can be selected for different designs for those characteristics. For example, LLDPE can provide a harder foliage needle to the touch, which may be preferred in some tree styles/designs, and LDPE can provide a softer foliage needle to the touch, which may be preferable to the designer for other tree styles. In some designs, a mix of different types of PE tips can be used in a single product, such as an artificial Christmas tree, coral, wreaths, or garland.

In an exemplary embodiment, the translucent artificial foliage 100 is used for an artificial Christmas tree. In this embodiment, the artificial Christmas tree is comprised of numerous branches, such as a branch with twigs depicted in FIG. 1. These branches can be made from a plurality of tips, which can be formed by the process of injection molding. The individual tips of the branches can be attached to a branch stem, such as a bendable metal wire, by the wrapping of a thread, such as a nylon thread, around the end of each tip and the branch stem. In an exemplary embodiment, the galvanized wire stem itself can be wrapped or otherwise coated in a white or translucent PE resin or painted in a whiteish color coating, in order to make it blend in with the translucent foliage material. In other embodiments, the branches can be made through an extrusion process rather than injection molding.

Figure 2:
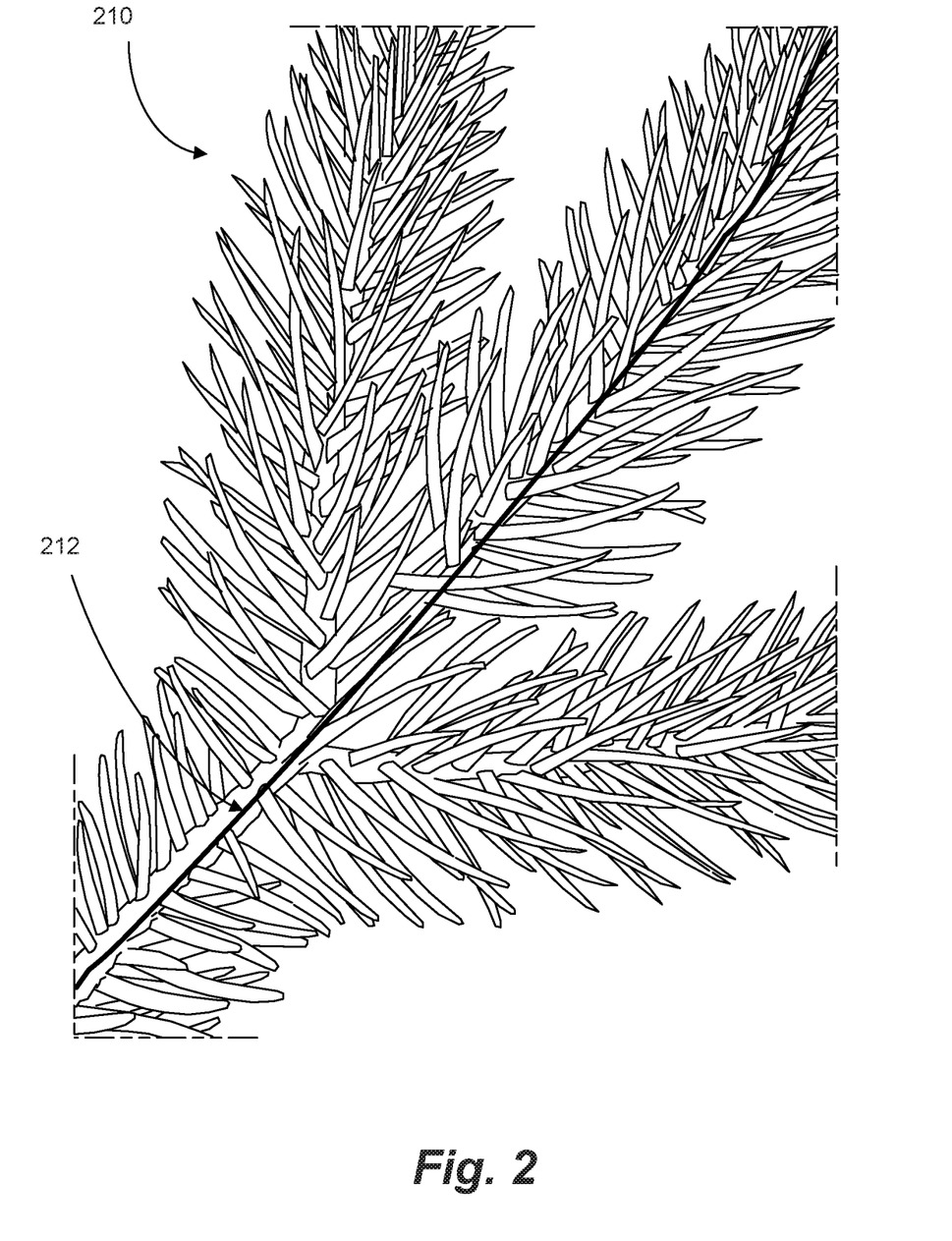
FIG. 2 is a schematic diagram of a branch including the translucent artificial foliage according to an exemplary embodiment of the present invention.

As shown in FIG. 2, the translucent artificial foliage 100 can be used to provide a portion of a branch 210. For example, the translucent artificial foliage 100 shown in FIG. 2 provides a branch stem 212 and needles of branch 210. The branch 210 provides multiple twigs having needles and the branch stem 212. The branch stem 212 in the exemplary embodiment shown FIG. 2 includes a bendable metal wire.

Figure 3:
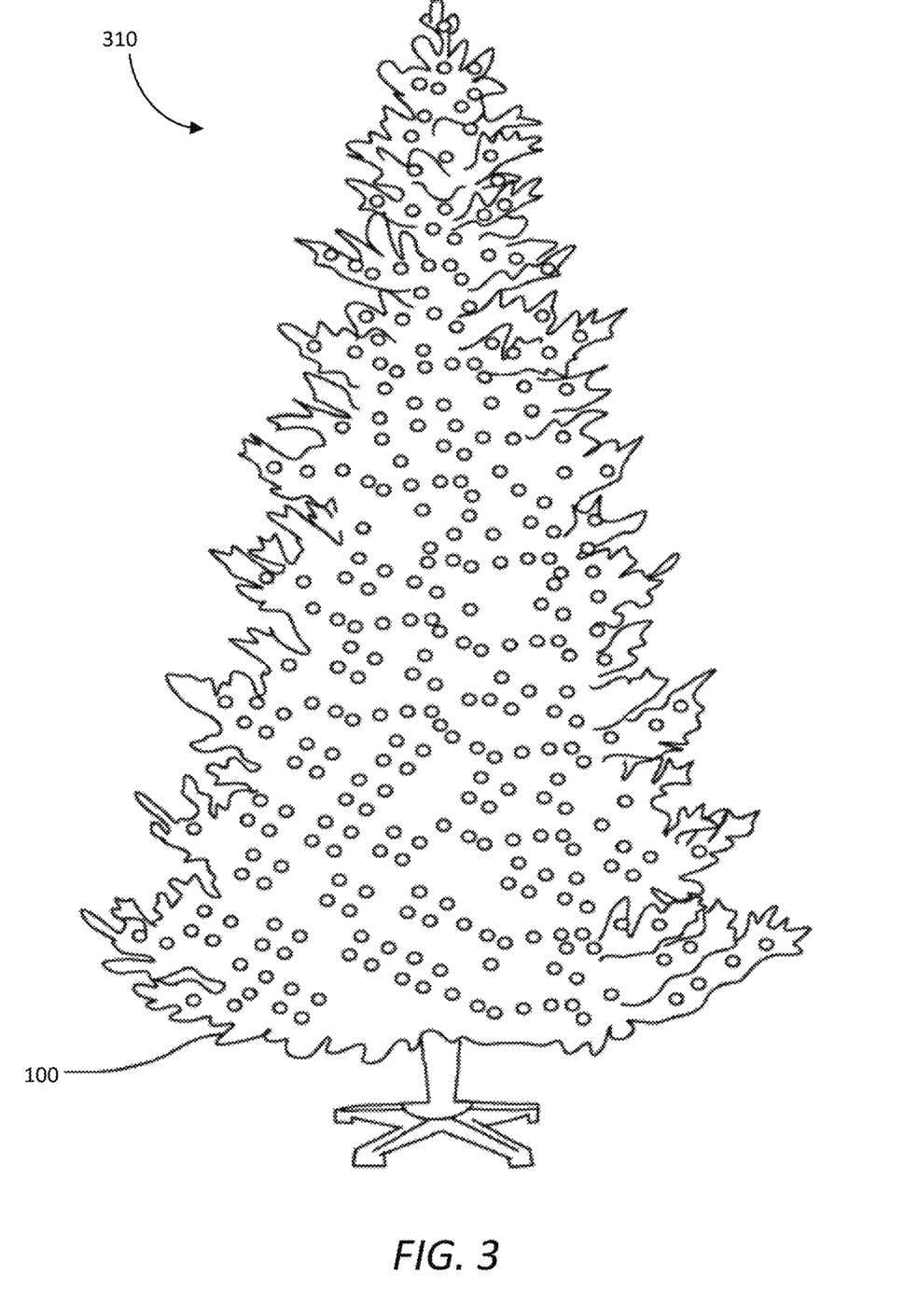
FIG. 3 is a schematic diagram of an artificial Christmas tree including translucent artificial foliage according to an exemplary embodiment of the present invention.

As shown in FIG. 3, the translucent artificial foliage 100 can be used for an artificial Christmas tree 310. The artificial Christmas tree in FIG. 3 is almost entirely formed of translucent artificial foliage 100. Embodiments of translucent artificial foliage 100 can provide shapes and types of trees that are replicated in the design of artificial trees. Those of skill in the art will appreciate that translucent artificial foliage 100 can be used for varying portions of the artificial Christmas tree, from a small portion of the tree to almost the entirety of the artificial Christmas tree, as shown in FIG. 3. For example, the translucent artificial foliage 100 shown in FIG. 3 provides the stem and needles of the branches of the tree. As shown in the exemplary embodiment in FIG. 3, the lights of the artificial Christmas tree can be diffused by the translucent artificial foliage 100; thus, the light at least partially travels through the translucent artificial foliage 100. Accordingly, the translucent artificial foliage 100 of the exemplary embodiment of the artificial Christmas tree is able to capture a portion of the light from the tree and disperse that light in a unique and novel manner. Furthermore, embodiments of the translucent artificial foliage 100 enable light to flow through or otherwise interact with the foliage to create a novel and stunning appearance. Embodiments of the translucent artificial foliage 100 can also be used to form bulbs or domes, or other coverings used in connection with lights or lighting devices, giving rise to stunning lighting effects or looks.

Those of skill in the art will appreciate that other items, such as wreaths and garland, can be formed in part with translucent artificial foliage 100. Accordingly, embodiments of the translucent artificial foliage 100 can be used in the foliage of garlands, swags, and wreaths, as well as bulbs, domes or other coverings used in connection for decorative lighting, and can also be used for decorating or ambiance. Further, similar to an artificial Christmas tree, the foliage of garland or wreaths or coral can be made from a plurality of tips.

In an exemplary embodiment, the translucent artificial foliage 100 can be made of a material mixture formed into objects by the method of injection molding. In an exemplary embodiment, the formula for the material for the translucent artificial foliage 100 can be a base component of PE with anti-UV additives combined with antioxidant properties in the range of about 0.1% to 0.9% of the total amount of foliage material. In one embodiment, the anti-UV additives can be in the approximate amount of 0.2% of the total amount of foliage material. Further, in an exemplary embodiment, the formula for the material for the translucent artificial foliage 100 can include phosphorus fire-retardant additives that can be included in the range of 0.5% to 3% of the total amount of foliage material. In one embodiment the fire-retardant additives can be included in the approximate amount of 1% of the total amount of foliage material. Additionally, an exemplary embodiment of the translucent artificial foliage 100 can include pigments or inks added for creation of hues or other effects. In one embodiment, the formula for the material for the translucent artificial foliage 100 can be a base component of PE with anti-UV additives combined with antioxidant properties in the approximate amount of 0.2% of the total amount of foliage material and phosphorus fire retardant additives in the approximate amount of 1% of the total amount of foliage material. In an alternative embodiment, the material mixture for the translucent artificial foliage 100 can be other polymer materials suitable for injection molding.

Figure 5:
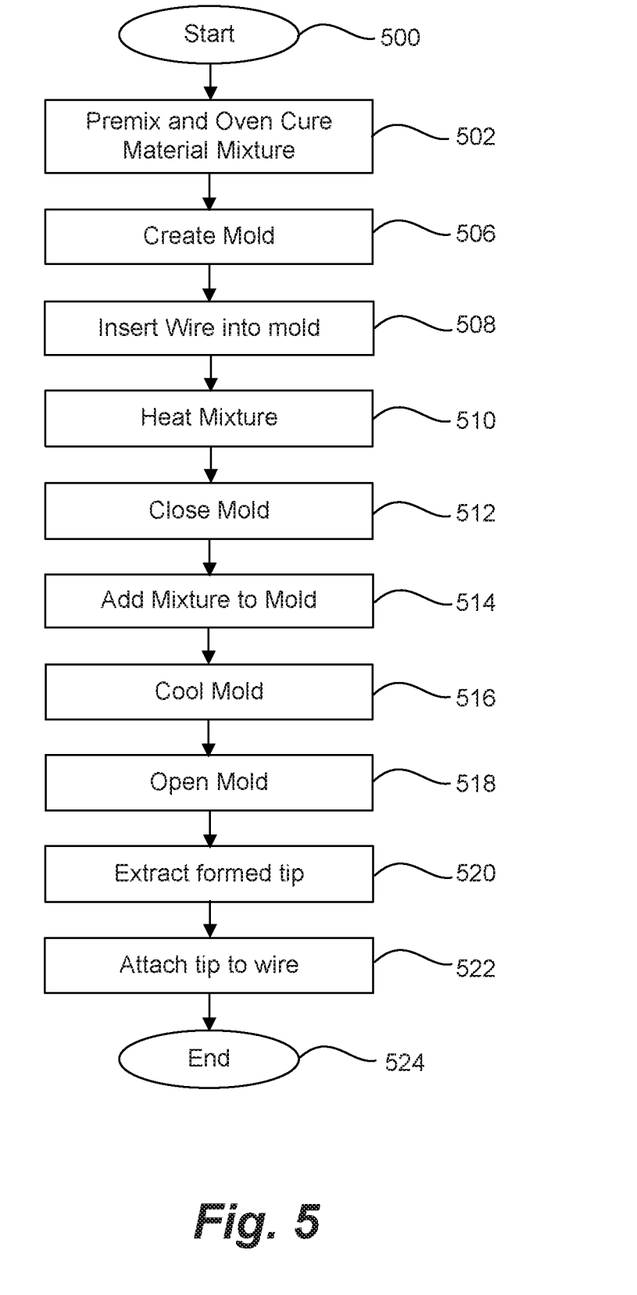
FIG. 5 is a flow chart of a method of manufacturing the translucent artificial foliage according to an exemplary embodiment of the present invention.

An exemplary embodiment of the present invention provides a method of manufacturing the translucent artificial foliage 100, described further with respect to FIG. 5.

In an exemplary embodiment, the translucent artificial foliage 100 can be used for an artificial Christmas tree 310 and the wiring used for lighting the tree can be wrapped or otherwise coated with a translucent material provided by the present invention in order to help the wiring blend into the translucent artificial foliage 100. In alternative embodiments, the wiring can be coated in opaque colors, also designed to blend into the foliage. In another embodiment, wireless lighting can be implemented for the artificial Christmas tree 310, and the components for transmitting and receiving power may be coated in translucent or opaque materials, designed to blend in with the translucent artificial foliage 100. In yet another embodiment, thin copper wiring may be provided with the artificial Christmas tree 310, or copper wiring can be coated to blend into the translucent artificial foliage 100.

In an exemplary embodiment, the needles for the artificial Christmas tree 310 with translucent artificial foliage 100 can be varied, such as adding other materials or pigments or light for various effects. In an exemplary embodiment, the translucent artificial foliage 100 can be created by adding hues or tints into the mixture, such as iridescence, or hues or tints to mimic sea glass, or other colors. In another embodiment materials can be applied to the translucent artificial foliage 100, such as flocking, glitter, or thin threads, to create the appearance of snow, ice, fairy dust, spider webs, cotton candy or fairy floss, or other effects or designs. In another embodiment, the translucent artificial foliage 100 can be made with tinting made to resemble the tints of sea glass, in order that light-translucent greens, clears, and blues, individually or separately, or in an array of shades or tints, such that the tree is made to give the impression of translucent sea glass found of the beach. Those of skill in the art will appreciate that the translucent artificial foliage 100 can be varied according to the desired design to generate different a look and feel.

In an exemplary embodiment, the translucent artificial foliage 100 can include reactive pigments or inks, which interact with different types of light, like UV light or normal light, or change in temperatures, and as a result, change color or other appearances. In another embodiment, the translucent artificial foliage 100 can be tips that include distinct blends of hues or other materials in a single tip. The tips can be further modified in another embodiment to include flocking or glitter.

Figure 4:
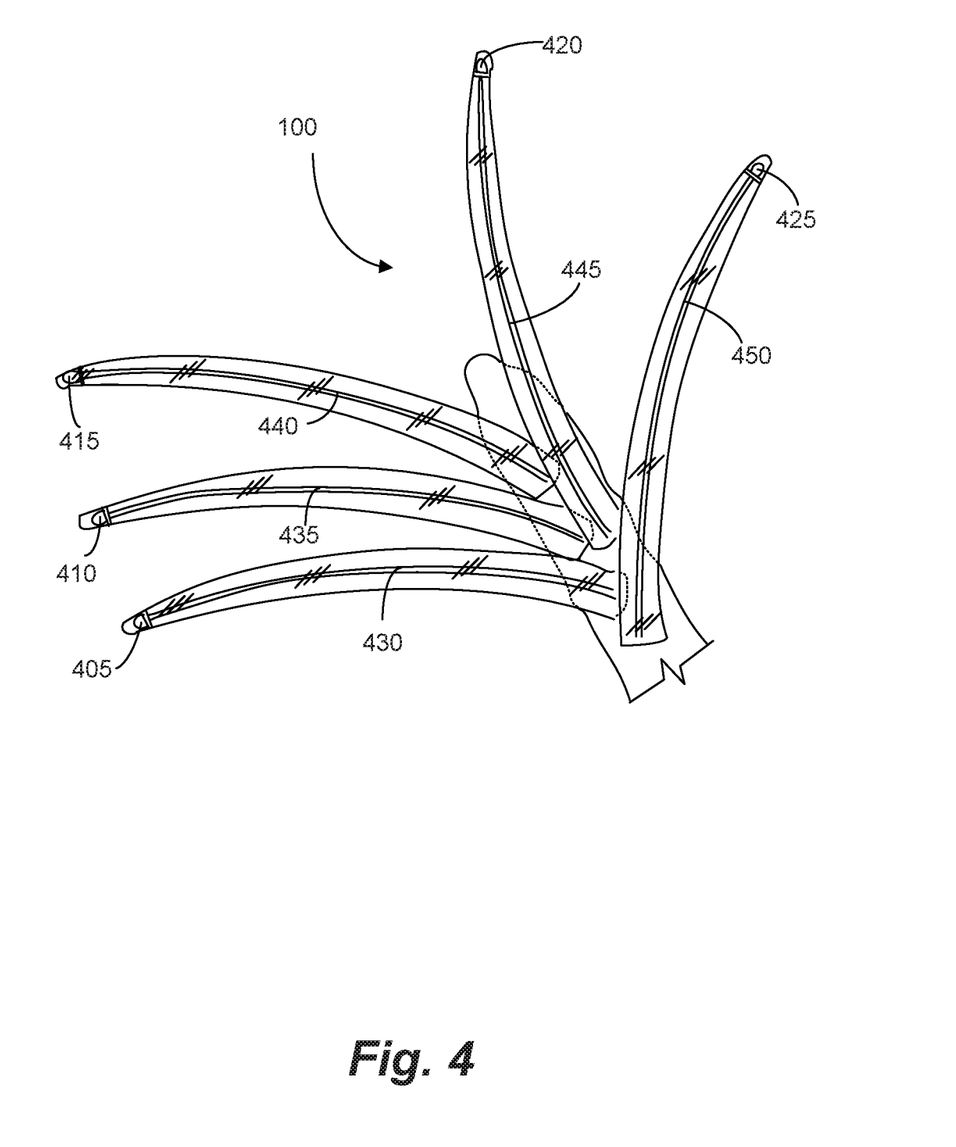
FIG. 4 is a schematic diagram of translucent artificial foliage including lighting elements according to an exemplary embodiment of the present invention.

As shown in FIG. 4, in an exemplary embodiment, the translucent artificial foliage 100 can include lighting elements 405, 410, 415, 420, and 425 that can provide white light or light of varying colors and/or patterns. Accordingly, the translucent artificial foliage 100 in an exemplary embodiment can disperse the light provided by lighting elements located internal to the translucent artificial foliage 100. In the exemplary embodiment shown in FIG. 4, the lighting elements 405, 410, 415, 420, and 425 in the translucent artificial foliage 100 are located at end portions that are ends of the needles of the translucent artificial foliage 100. In an exemplary embodiment, lighting elements are located at end portions of the foliage, which are ends of coral branches. In an exemplary embodiment, the lighting elements 405, 410, 415, 420, and 425 can be Light-Emitting Diodes (LEDs). In other embodiments, the lighting elements 405, 410, 415, 420, and 425 can be incandescent light bulbs. Those of skill in the art will appreciate the lighting elements 405, 410, 415, 420, and 425 can be varied according to the requirements and needs of a particular design.

In the exemplary embodiment shown in FIG. 4, the lighting elements 405, 410, 415, 420, and 425 are positioned in the tips of the needles of the translucent artificial foliage 100. Those of skill in the art will appreciate that in other embodiments of the translucent artificial foliage 100, the lighting elements can be placed at a midpoint in the needle of the translucent artificial foliage 100. In other embodiments of the translucent artificial foliage 100, the lighting elements can be placed only in the stem of a branch of translucent artificial foliage 100 or sporadically placed in various areas of the translucent artificial foliage 100.

The lighting elements 405, 410, 415, 420, and 425 shown in FIG. 4 can be electrically connected via wires 430, 435, 440, 445, and 450 to a power source. In an alternative embodiment, the lighting elements 405, 410, 415, 420, and 425 can be wirelessly connected to a power source, thereby removing the need for wires 430, 435, 440, 445, and 450. In exemplary embodiment, the lighting elements can be inserted into the mold cavities for the PE tips. Alternatively, the lighting elements can be inserted after the formation of the translucent artificial foliage 100.

In an alternative embodiment, light can be distributed through the translucent artificial foliage 100 via fiber optics. In this embodiment, the translucent artificial foliage 100 can include optical fiber made and incorporated into branches to mimic hard needles. Further, in this embodiment, a lighting apparatus can be located in the base of the tree or external to the tree, and light can be projected thru the translucent artificial foliage 100 with open ends at the tips of the needles of the translucent artificial foliage 100.

FIG. 5 depicts an exemplary embodiment of the present invention providing a method of manufacturing the translucent artificial foliage 100. As with the other embodiments disclosed herein, the method shown is only an example, and steps may be added, removed, altered, reordered, or a combination thereof. The method generally may be used to form a tip or a plurality of tips that can be used to form foliage.

The method includes starting at step 500. At step 502, the method includes premixing a material mixture and oven curing it at 90° C. The material mixture may include any mixture described herein and may be referred to as an artificial foliage material. The premixing may include combining a polymer with an anti-UV additive component in the range of about 0.1% to 0.9% of the total artificial foliage material and a phosphorus fire-retardant additive component in the range of 0.5% to 3% of the total artificial foliage material.

At step 506, the method includes creating a mold of a desired design for the tips of a branch. At step 508, a wire, which may be metal, and may be painted or otherwise coated, may be inserted into the mold and the wire can provide the stem of the tip. At step 510, the method includes heating the material mixture. At step 512, the method includes closing the mold. At step 514, the method includes adding the material mixture to the mold by, for example, injection. At step 516, the mold is cooled, and the material mixture and wire (if added) form a formed tip. At step 518, the cooled mold can subsequently be opened, allowing for the formed tip to be extracted at step 520. At step 522, the tip can then be attached to metal wires, which may be larger, by a process of nylon threading or wrapping, to create a branch. A person of ordinary skill in the art will appreciate that branches can also be made in other ways, such as inserting the formed tips into a hollow stem. At step 524, the method ends. Some or all of the steps may be repeated to form a plurality of tips which may then be attached to one or more metal wires to form one or more branches. The branches may then be used to form an artificial tree or other foliage.

The invention claimed is:

1. An artificial foliage comprising an artificial foliage material, the artificial foliage material comprising:
   a polymer;
   an anti-UV additive component in the range of 0.1% to 0.9% of the total artificial foliage material;
   a phosphorus fire-retardant additive component in the range of 0.5% to 3% of the total artificial foliage material, wherein the artificial foliage material is translucent; and a plurality of lighting elements internal to the artificial foliage material.

2. The artificial foliage of claim 1, wherein the artificial foliage is shaped as foliage of a Christmas tree.

3. The artificial foliage of claim 1, wherein the artificial foliage is shaped as coral.

4. The artificial foliage of claim 1, wherein the artificial foliage is shaped as sea glass.

5. The artificial foliage of claim 1, wherein the artificial foliage is shaped as ice, melting ice, or snow crystals.

6. The artificial foliage of claim 1, wherein the artificial foliage forms a bulb or dome.

7. The artificial foliage of claim 1, wherein the artificial foliage includes a reactive pigment.

8. The artificial foliage of claim 1, wherein the artificial foliage includes a plurality of reactive pigments, each of the reactive pigments operable to react with a different spectrum of light.

9. The artificial foliage of claim 8, wherein each of the reactive pigments changes color when reacting with light.

\* \* \* \* \*